United States Patent
Liles et al.

(10) Patent No.: US 9,631,517 B2
(45) Date of Patent: Apr. 25, 2017

(54) MULTI-PIECE FAIRING FOR MONOLITHIC TURBINE EXHAUST CASE

(71) Applicant: United Technologies Corporation, Hartford, CT (US)

(72) Inventors: Jason David Liles, Port Saint Lucie, FL (US); Charles T. Ruby, Loxahatchee, FL (US)

(73) Assignee: United Technologies Corporation, Farmington, CT (US)

(*) Notice: Subject to any disclaimer, the term of this patent is extended or adjusted under 35 U.S.C. 154(b) by 1153 days.

(21) Appl. No.: 13/730,893

(22) Filed: Dec. 29, 2012

(65) Prior Publication Data

US 2014/0186167 A1 Jul. 3, 2014

(51) Int. Cl.
| | |
|---|---|
| F01D 9/04 | (2006.01) |
| F01D 25/24 | (2006.01) |
| F01D 25/16 | (2006.01) |
| F02C 7/20 | (2006.01) |

(52) U.S. Cl.
CPC ............. *F01D 25/162* (2013.01); *F01D 9/04* (2013.01); *F01D 25/24* (2013.01); *F02C 7/20* (2013.01); *Y10T 29/49826* (2015.01)

(58) Field of Classification Search
CPC .......... F01D 9/04; F01D 25/162; F01D 25/24; F01D 25/246; F01D 25/28; F01D 25/00; F02C 7/20; F05D 2240/11; F05D 2240/14
See application file for complete search history.

(56) References Cited

U.S. PATENT DOCUMENTS

| | | | |
|---|---|---|---|
| 2,124,108 | A | 7/1938 | Grece |
| 2,427,244 | A | 9/1947 | Warner |
| 2,845,249 | A | 7/1958 | Taylor et al. |
| 3,048,452 | A | 8/1962 | Addie |
| 3,182,955 | A | 5/1965 | Hyde |
| 3,204,406 | A | 9/1965 | Howes et al. |
| 3,384,345 | A | 5/1968 | Neath et al. |
| 3,576,328 | A | 4/1971 | Vose |

(Continued)

FOREIGN PATENT DOCUMENTS

| | | |
|---|---|---|
| EP | 1557528 | 7/2005 |
| EP | 1544415 | 12/2012 |
| WO | 2012158070 | 11/2012 |

OTHER PUBLICATIONS

International Searching Authority, PCT Notification of Transmittal of the International Search Report and the Written Opinion, Apr. 21, 2014, 18 pages.

*Primary Examiner* — Craig Kim
*Assistant Examiner* — Danielle M Christensen
(74) *Attorney, Agent, or Firm* — Kinney & Lange, P.A.

(57) ABSTRACT

A gas turbine engine component comprises a frame and a fairing. The frame comprises a monolithic ring-strut-ring structure. The fairing comprises a multi-segment ring-strut-ring structure that is assembled around the frame. A method of assembling the frame and fairing comprises positioning a plurality of shroud segments within a frame and joining the plurality of shroud segments to each other so that the fairing is trapped within the frame. In one embodiment, the fairing comprises a plurality of outer diameter shroud segments, a plurality of inner diameter shroud segments, a plurality of strut segments, and stiffening features connected to the plurality of strut segments to strengthen the fairing.

13 Claims, 11 Drawing Sheets

(56) References Cited

U.S. PATENT DOCUMENTS

| | | |
|---|---|---|
| 3,704,075 A | 11/1972 | Karstensen et al. |
| 3,797,085 A | 3/1974 | Aartman |
| 3,970,319 A | 7/1976 | Carroll et al. |
| 4,008,978 A | 2/1977 | Smale |
| 4,038,815 A | 8/1977 | Heitmann et al. |
| 4,044,555 A | 8/1977 | McLoughlin et al. |
| 4,050,133 A | 9/1977 | Cretella et al. |
| 4,057,371 A | 11/1977 | Pilarczyk |
| 4,076,452 A | 2/1978 | Hartmann |
| 4,088,422 A | 5/1978 | Martin |
| 4,114,248 A | 9/1978 | Smith et al. |
| 4,118,927 A | 10/1978 | Kronogard |
| 4,126,405 A | 11/1978 | Bobo et al. |
| 4,176,433 A | 12/1979 | Lee et al. |
| 4,187,054 A | 2/1980 | Landis, Jr. et al. |
| 4,245,951 A | 1/1981 | Minnich |
| 4,305,697 A | 12/1981 | Cohen et al. |
| 4,326,833 A | 4/1982 | Zelahy et al. |
| 4,357,025 A | 11/1982 | Eckart |
| 4,369,016 A | 1/1983 | Dennison |
| 4,472,108 A | 9/1984 | Pask |
| 4,477,222 A | 10/1984 | Wolf |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,726,101 A | 2/1988 | Draghi et al. |
| 4,738,453 A | 4/1988 | Ide |
| 4,756,536 A | 7/1988 | Belcher |
| 4,785,623 A | 11/1988 | Reynolds |
| 4,793,770 A | 12/1988 | Schonewald et al. |
| 4,820,117 A | 4/1989 | Larrabee et al. |
| 4,825,645 A | 5/1989 | Bell, III |
| 4,856,963 A | 8/1989 | Klapproth et al. |
| 4,889,469 A | 12/1989 | Wilkinson |
| 4,916,892 A | 4/1990 | Pope |
| 4,920,742 A | 5/1990 | Nash et al. |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | Von Benken et al. |
| 5,100,158 A | 3/1992 | Gardner |
| 5,108,116 A | 4/1992 | Johnson et al. |
| 5,114,159 A | 5/1992 | Baird et al. |
| 5,169,159 A | 12/1992 | Pope et al. |
| 5,174,584 A | 12/1992 | Lahrman |
| 5,174,715 A | 12/1992 | Martin |
| 5,188,507 A | 2/1993 | Sweeney |
| 5,211,536 A | 5/1993 | Ackerman et al. |
| 5,211,541 A | 5/1993 | Fledderjohn et al. |
| 5,224,822 A | 7/1993 | Lenahan et al. |
| 5,236,302 A | 8/1993 | Weisgerber et al. |
| 5,246,295 A | 9/1993 | Ide |
| 5,248,240 A | 9/1993 | Correia |
| 5,252,026 A | 10/1993 | Shepherd |
| 5,269,057 A | 12/1993 | Mendham |
| 5,271,714 A | 12/1993 | Shepherd et al. |
| 5,272,869 A | 12/1993 | Dawson et al. |
| 5,273,397 A | 12/1993 | Czachor et al. |
| 5,289,677 A | 3/1994 | Jarrell |
| 5,292,227 A | 3/1994 | Czachor et al. |
| 5,312,227 A | 5/1994 | Grateau et al. |
| 5,338,154 A | 8/1994 | Meade et al. |
| 5,357,744 A * | 10/1994 | Czachor ............... F01D 9/065 415/134 |
| 5,362,204 A | 11/1994 | Matyscak et al. |
| 5,370,402 A | 12/1994 | Gardner et al. |
| 5,372,476 A | 12/1994 | Hemmelgarn et al. |
| 5,385,409 A | 1/1995 | Ide |
| 5,401,036 A | 3/1995 | Basu |
| 5,407,319 A | 4/1995 | Harrogate et al. |
| 5,417,545 A | 5/1995 | Harrogate |
| 5,438,745 A | 8/1995 | Cox |
| 5,438,756 A | 8/1995 | Halchak et al. |
| 5,474,305 A | 12/1995 | Flower |
| 5,479,782 A | 1/1996 | Parker et al. |
| 5,483,792 A | 1/1996 | Czachor et al. |
| 5,558,341 A | 9/1996 | McNickle et al. |
| 5,609,476 A | 3/1997 | Kim et al. |
| 5,632,493 A | 5/1997 | Gardner |
| 5,634,767 A | 6/1997 | Dawson |
| 5,690,469 A | 11/1997 | Deal et al. |
| 5,706,646 A | 1/1998 | Wilde et al. |
| 5,732,468 A | 3/1998 | Galley et al. |
| 5,740,674 A | 4/1998 | Beutin et al. |
| 5,755,445 A | 5/1998 | Arora |
| 5,765,993 A | 6/1998 | Weiss |
| 5,851,105 A | 12/1998 | Fric et al. |
| 5,911,400 A | 6/1999 | Niethammer et al. |
| 5,961,279 A | 10/1999 | Ingistov |
| 5,997,245 A | 12/1999 | Tomita et al. |
| 6,148,517 A | 11/2000 | Johnson et al. |
| 6,179,560 B1 | 1/2001 | Kouris et al. |
| 6,196,550 B1 | 3/2001 | Arora et al. |
| 6,196,551 B1 | 3/2001 | Zellers |
| 6,220,815 B1 | 4/2001 | Rainous et al. |
| 6,227,800 B1 | 5/2001 | Spring et al. |
| 6,343,912 B1 | 2/2002 | Manteiga et al. |
| 6,358,001 B1 | 3/2002 | Bosel et al. |
| 6,358,004 B1 | 3/2002 | Shiga et al. |
| 6,364,316 B1 | 4/2002 | Arora |
| 6,376,801 B1 | 4/2002 | Farrell et al. |
| 6,394,750 B1 | 5/2002 | Hiskes |
| 6,416,278 B1 | 7/2002 | Caddell, Jr. et al. |
| 6,439,841 B1 | 8/2002 | Bosel |
| 6,450,762 B1 | 9/2002 | Munshi |
| 6,471,213 B1 | 10/2002 | Yuri et al. |
| 6,511,284 B2 | 1/2003 | Darnell et al. |
| 6,517,313 B2 | 2/2003 | Rogers |
| 6,537,023 B1 | 3/2003 | Aksit et al. |
| 6,546,627 B1 | 4/2003 | Sekihara et al. |
| 6,547,257 B2 | 4/2003 | Cromer |
| 6,547,518 B1 | 4/2003 | Czachor et al. |
| 6,553,665 B2 | 4/2003 | Gunn et al. |
| 6,571,560 B2 | 6/2003 | Tatsumi et al. |
| 6,601,853 B2 | 8/2003 | Inoue |
| 6,612,807 B2 | 9/2003 | Czachor |
| 6,619,030 B1 | 9/2003 | Seda et al. |
| 6,637,751 B2 | 10/2003 | Aksit et al. |
| 6,638,013 B2 | 10/2003 | Nguyen et al. |
| 6,641,363 B2 | 11/2003 | Barrett et al. |
| 6,651,986 B2 | 11/2003 | Chevrette et al. |
| 6,652,229 B2 | 11/2003 | Lu |
| 6,672,833 B2 | 1/2004 | MacLean et al. |
| 6,685,431 B2 | 2/2004 | Hiskes |
| 6,719,524 B2 | 4/2004 | Nguyen et al. |
| 6,736,401 B2 | 5/2004 | Chung et al. |
| 6,752,592 B2 | 6/2004 | Mohammed-Fakir et al. |
| 6,792,758 B2 | 9/2004 | Dowman |
| 6,796,765 B2 | 9/2004 | Kosel et al. |
| 6,805,356 B2 | 10/2004 | Inoue |
| 6,807,802 B2 | 10/2004 | Platts |
| 6,811,154 B2 | 11/2004 | Proctor et al. |
| 6,883,303 B1 | 4/2005 | Seda |
| 6,918,594 B2 | 7/2005 | Sund et al. |
| 6,935,631 B2 | 8/2005 | Inoue |
| 6,983,608 B2 | 1/2006 | Allen, Jr. et al. |
| 7,000,406 B2 | 2/2006 | Markarian et al. |
| 7,004,720 B2 | 2/2006 | Synnott et al. |
| 7,025,563 B2 | 4/2006 | Servadio et al. |
| 7,080,513 B2 | 7/2006 | Reichert |
| 7,093,440 B2 | 8/2006 | Howell et al. |
| 7,094,026 B2 | 8/2006 | Coign et al. |
| 7,100,358 B2 | 9/2006 | Gekht et al. |
| 7,121,802 B2 | 10/2006 | Athans et al. |
| 7,152,864 B2 | 12/2006 | Amos et al. |
| 7,200,933 B2 | 4/2007 | Lundgren et al. |
| 7,207,771 B2 | 4/2007 | Synnott et al. |
| 7,225,624 B2 | 6/2007 | Ress, Jr. |
| 7,229,249 B2 | 6/2007 | Durocher et al. |
| 7,238,008 B2 | 7/2007 | Bobo et al. |
| 7,353,647 B2 | 4/2008 | Orlando et al. |

(56) References Cited

U.S. PATENT DOCUMENTS

| | | |
|---|---|---|
| 7,360,986 B2 | 4/2008 | Hugonie et al. |
| 7,360,988 B2 | 4/2008 | Lee et al. |
| 7,367,567 B2 | 5/2008 | Farah et al. |
| 7,371,044 B2 | 5/2008 | Nereim |
| 7,389,583 B2 | 6/2008 | Lundgren |
| 7,395,669 B2 | 7/2008 | Sherwood |
| 7,470,110 B2 | 12/2008 | Jonsson |
| 7,481,037 B2 | 1/2009 | Takaya et al. |
| 7,500,824 B2 | 3/2009 | Cheng et al. |
| 7,565,796 B2 | 7/2009 | Eleftheriou et al. |
| 7,578,590 B2 | 8/2009 | Kagami et al. |
| 7,578,653 B2 | 8/2009 | Klasing et al. |
| 7,584,620 B2 | 9/2009 | Weaver et al. |
| 7,614,150 B2 | 11/2009 | Lundgren |
| 7,628,587 B2 | 12/2009 | McFeat et al. |
| 7,631,879 B2 | 12/2009 | Diantonio |
| 7,637,719 B2 | 12/2009 | Graebeldinger |
| 7,673,461 B2 | 3/2010 | Cameriano et al. |
| 7,704,042 B2 | 4/2010 | Brueckner et al. |
| 7,726,936 B2 | 6/2010 | Keller et al. |
| 7,735,833 B2 | 6/2010 | Braun et al. |
| 7,743,600 B2 | 6/2010 | Babu et al. |
| 7,771,164 B2 | 8/2010 | Manteiga et al. |
| 7,775,022 B2 | 8/2010 | Tardif et al. |
| 7,798,768 B2 | 9/2010 | Strain et al. |
| 7,824,152 B2 | 11/2010 | Morrison |
| 7,836,702 B2 | 11/2010 | Grivas et al. |
| 7,946,809 B2 | 5/2011 | Meier et al. |
| 7,967,559 B2 | 6/2011 | Bunker |
| 7,976,274 B2 | 7/2011 | Lee et al. |
| 8,015,818 B2 | 9/2011 | Wilson et al. |
| 8,016,553 B1 | 9/2011 | Liang |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,128,339 B2 | 3/2012 | Kondo et al. |
| 8,128,357 B2 | 3/2012 | Bergander et al. |
| 8,152,450 B1 | 4/2012 | Aho |
| 8,152,451 B2 | 4/2012 | Manteiga et al. |
| 8,157,509 B2 | 4/2012 | Black et al. |
| 8,166,767 B2 | 5/2012 | Grivas et al. |
| 8,201,413 B2 | 6/2012 | Lavin et al. |
| 8,206,100 B2 | 6/2012 | Schuler et al. |
| 8,215,901 B2 | 7/2012 | Kapustka |
| 8,220,150 B2 | 7/2012 | Pellet et al. |
| 8,221,071 B2 | 7/2012 | Wojno et al. |
| 8,226,361 B2 | 7/2012 | Prentice et al. |
| 8,231,142 B2 | 7/2012 | Olver |
| 8,237,082 B2 | 8/2012 | Beck et al. |
| 8,240,986 B1 | 8/2012 | Ebert |
| 8,245,518 B2 | 8/2012 | Durocher et al. |
| 8,262,342 B2 | 9/2012 | Morris et al. |
| 8,282,346 B2 | 10/2012 | Deodhar et al. |
| 8,347,500 B2 | 1/2013 | Durocher et al. |
| 8,371,127 B2 | 2/2013 | Durocher et al. |
| 8,388,310 B1 | 3/2013 | Diakunchak |
| 8,397,383 B2 | 3/2013 | Barnett et al. |
| 8,402,769 B2 | 3/2013 | Maltson |
| 8,408,011 B2 | 4/2013 | Fontaine et al. |
| 8,408,555 B2 | 4/2013 | Garrison |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2003/0161716 A1 | 8/2003 | Nguyen et al. |
| 2005/0046113 A1 | 3/2005 | Inoue |
| 2006/0010852 A1 | 1/2006 | Gekht et al. |
| 2006/0260127 A1 | 11/2006 | Gekht et al. |
| 2007/0119184 A1 | 5/2007 | Satou et al. |
| 2008/0083225 A1 | 4/2008 | Fish et al. |
| 2008/0166226 A1 | 7/2008 | Tildsley |
| 2009/0053046 A1 | 2/2009 | Black et al. |
| 2009/0115141 A1 | 5/2009 | Simmons |
| 2010/0054927 A1 | 3/2010 | Almstedt et al. |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0135770 A1 | 6/2010 | Durocher et al. |
| 2010/0135777 A1* | 6/2010 | Manteiga ............... F01D 9/02 415/190 |
| 2010/0202872 A1 | 8/2010 | Weidmann |
| 2010/0275614 A1 | 11/2010 | Fontaine et al. |
| 2010/0303608 A1 | 12/2010 | Kataoka et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0030387 A1 | 2/2011 | Kumar et al. |
| 2011/0052398 A1 | 3/2011 | Fulayter et al. |
| 2011/0073745 A1 | 3/2011 | Duchatelle et al. |
| 2011/0081239 A1 | 4/2011 | Durocher |
| 2011/0081240 A1 | 4/2011 | Durocher et al. |
| 2011/0214433 A1 | 9/2011 | Feindel et al. |
| 2011/0262277 A1 | 10/2011 | Sjoqvist et al. |
| 2011/0274534 A1 | 11/2011 | Hayton |
| 2011/0302929 A1 | 12/2011 | Bruhwiler |
| 2012/0034074 A1 | 2/2012 | Haggmark |
| 2012/0045319 A1 | 2/2012 | Snyder et al. |
| 2012/0111023 A1 | 5/2012 | Sjoqvist et al. |
| 2012/0163964 A1 | 6/2012 | Chuong et al. |
| 2012/0177489 A1 | 7/2012 | Batt |
| 2012/0189438 A1 | 7/2012 | Feigleson et al. |
| 2012/0204569 A1 | 8/2012 | Schubert |
| 2012/0233858 A1 | 9/2012 | McMahon et al. |
| 2012/0297791 A1 | 11/2012 | Suciu et al. |
| 2012/0321450 A1 | 12/2012 | Aschenbruck et al. |
| 2013/0051992 A1 | 2/2013 | Diakunchak |
| 2013/0052006 A1 | 2/2013 | Petty |
| 2013/0058756 A1 | 3/2013 | Tham et al. |
| 2013/0084166 A1 | 4/2013 | Klingels |
| 2013/0089416 A1 | 4/2013 | Bouchard et al. |
| 2013/0115051 A1 | 5/2013 | Bouchard et al. |
| 2013/0115076 A1 | 5/2013 | Bouchard et al. |
| 2013/0175327 A1 | 7/2013 | Fontaine et al. |
| 2014/0003922 A1* | 1/2014 | Daniels ............... F01D 25/24 415/182.1 |
| 2014/0099194 A1* | 4/2014 | Johnston ............... F01D 9/02 415/182.1 |
| 2014/0373556 A1* | 12/2014 | Aronsson ............ F01D 25/162 60/796 |

\* cited by examiner

MULTI-PIECE FAIRING FOR MONOLITHIC TURBINE EXHAUST CASE

BACKGROUND

The present disclosure relates generally to gas turbine engine exhaust cases. More particularly, the present disclosure relates to design and construction of fairings that fit around and protect ring-strut-ring structures.

Turbine Exhaust Cases (TEC) typically comprise structural frames that support the very aft end of a gas turbine engine. In aircraft applications, the TEC can be utilized to mount the engine to the aircraft airframe. In industrial gas turbine applications, the TEC can be utilized to couple the gas turbine engine to an electrical generator. A typical TEC comprises an outer ring that couples to the outer diameter case of the low pressure turbine, an inner ring that surrounds the engine centerline so as to support shafting in the engine, and a plurality of struts connecting the inner and outer rings. As such, the TEC is typically subject to various types of loading, thereby requiring the TEC to be structurally strong and rigid. Due to the placement of the TEC within the hot gas stream exhausted from the turbines of the gas turbine engine, it is typically desirable to shield the TEC structural frame with a fairing that is able to withstand direct impingement of the hot gas stream. The fairing additionally takes on a ring-strut-ring configuration wherein the struts are hollow to surround the frame struts. The structural frame and the fairing can each be optimized for their respective functions, such as load bearing and temperature capabilities.

Conventionally, manufacture of a TEC has involved casting the ring-strut-ring frame as a single piece and separately producing a ring-strut-ring fairing. Typically, the frame is separated into a plurality of pieces, reassembled in-place with the fairing, and welded or bolted back together. Historically, it has been simpler to reassemble the frame within the fairing in order to protect the structural and aerodynamic integrity of the fairing. However, separating the frame into pieces inherently produces structural weaknesses that may degrade performance. There is, therefore, a need for improved manufacturing and assembly processes for turbine exhaust cases.

SUMMARY

The present disclosure is directed to a ring-strut-ring structure for a gas turbine engine component such as a turbine exhaust case. The gas turbine engine component comprises a frame and a fairing. The frame comprises a monolithic ring-strut-ring structure. The fairing comprises a multi-segment ring-strut-ring structure that is assembled around the frame.

A method for assembling a gas turbine engine structural component comprises fabricating a monolithic frame, and fabricating a plurality of shroud segments that are shaped to mate with the frame. The plurality of shroud segments is positioned within the frame so as to form a fairing that defines the flow path. The plurality of segments is joined to each other so that the fairing is trapped onto the frame.

In another embodiment of the present disclosure, a fairing comprises a plurality of outer diameter shroud segments, a plurality of inner diameter shroud segments, a plurality of strut segments, and stiffening features connected to the plurality of strut segments to strengthen the fairing.

DETAILED DESCRIPTION

Figure 1:
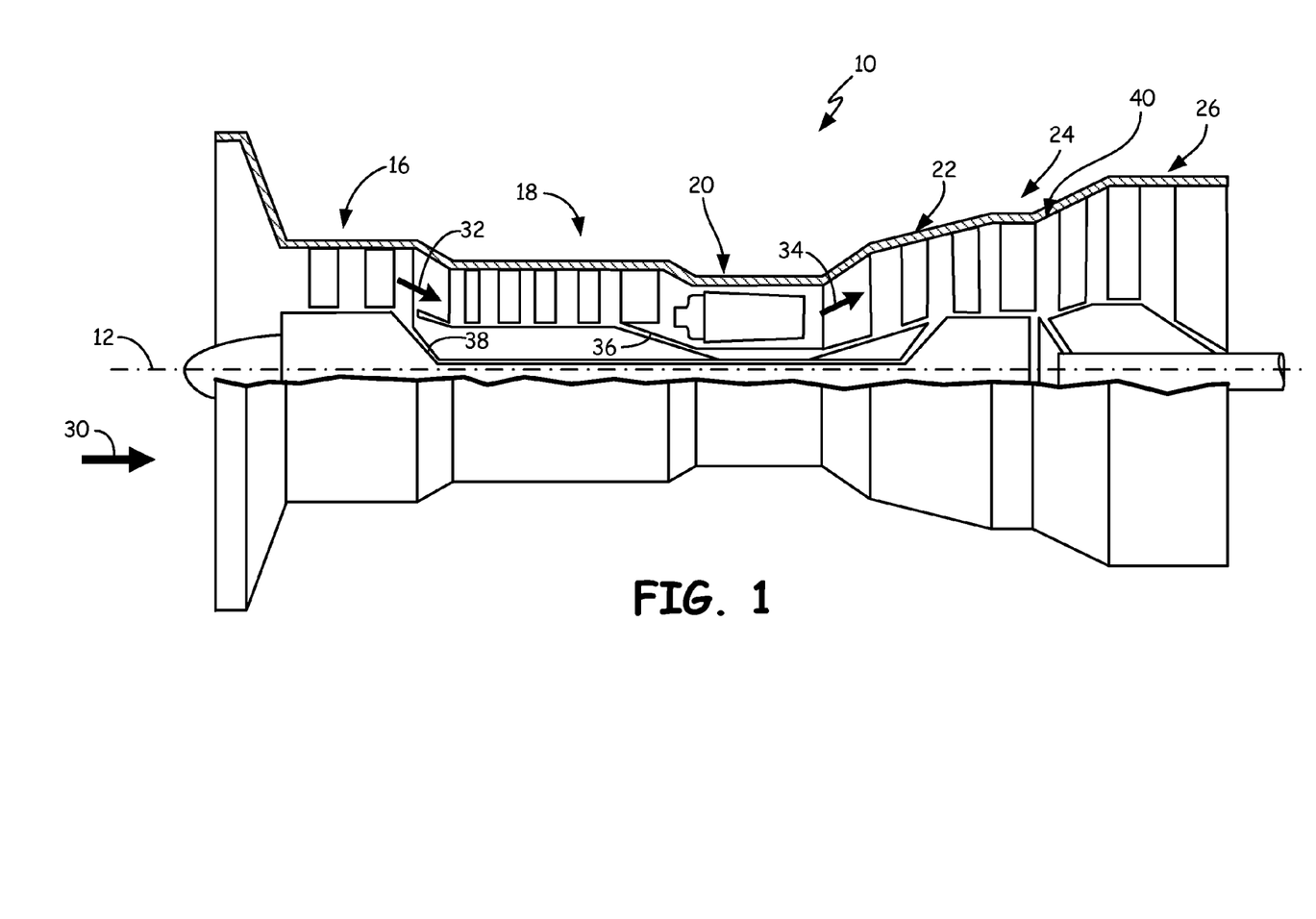
FIG. 1 is a side sectional schematic view of an industrial gas turbine engine having a turbine exhaust case of the present invention.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes, in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressors 16 and 18. Fuel mixes with pressurized air 32 in combustor section 20, where it is burned. Once burned, combustion gases 34 expand through high and low pressure turbine sections 22, 24 and through power turbine section 26. High and low pressure turbine sections 22 and 24 drive high and low pressure rotor shafts 36 and 38 respectively, which rotate in response to the combustion products and thus rotate the attached high and low pressure compressor sections 18 and 16. Power turbine section 26 may, for example, drive an electrical generator, pump, or gearbox (not shown).

Low Pressure Turbine Exhaust Case (LPTEC) 40 is positioned between low pressure turbine section 24 and power turbine section 26. LPTEC 40 defines a flow path for gas exhausted from low pressure turbine section 24 that is conveyed to power turbine 26. LPTEC 40 also provides structural support for gas turbine engine 10.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to an LPTEC, the present invention is applicable to other components of gas turbine engines, such as intermediate cases, mid-turbine frames and the like.

Figure 2A:
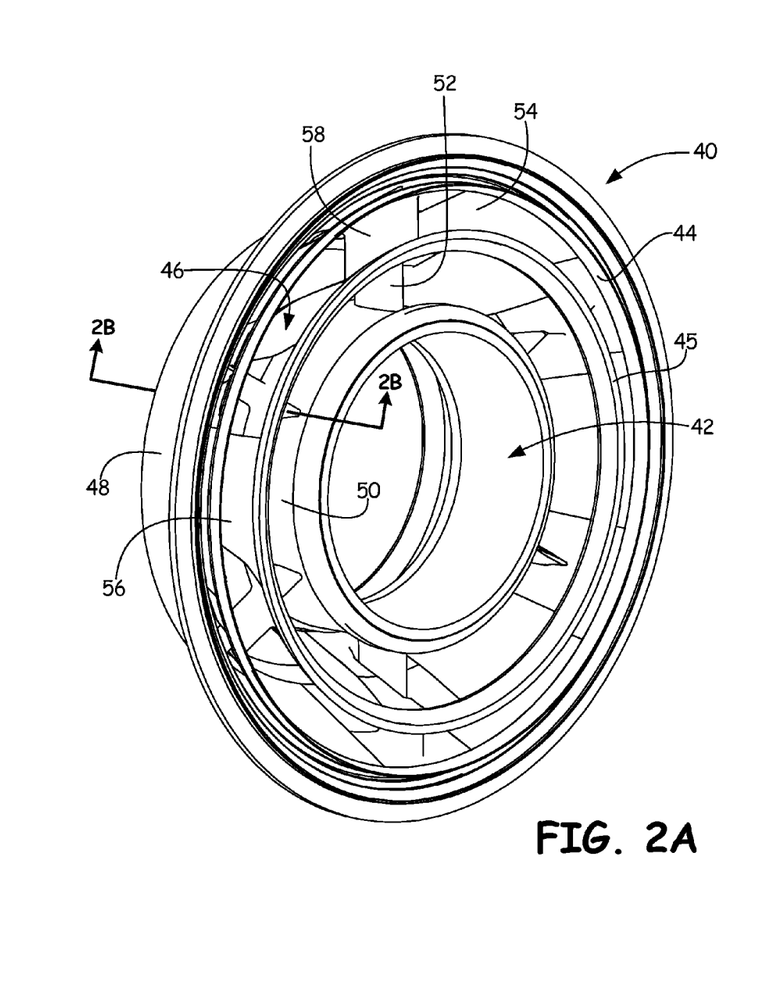
FIG. 2A is a perspective view of a turbine exhaust case in which a ring-strut-ring fairing is assembled within a ring-strut-ring frame.

FIG. 2A shows an exploded view of Low Pressure Turbine Exhaust Case (LPTEC) 40. LPTEC 40 includes frame 42, outer load ring 44, inner load ring 45, and fairing 46. Frame 42 includes outer ring 48, inner ring 50, and struts 52. Fairing 46 includes outer ring 54, inner ring 56, and struts 58. As will be discussed subsequently, fairing 46 is fabricated as a plurality of pieces or segments (see FIG. 4) that are assembled in-place with frame 42, which is fabricated as a single-piece component.

Frame 42 comprises a stator component of gas turbine engine 10 (FIG. 1) that is typically mounted between low pressure turbine section 24 and power turbine section 26. In the described embodiment, outer ring 48 of frame 42 is conically shaped, while inner ring 50 is cylindrically shaped. In other embodiments, outer ring 48 and inner ring 50 may have other shapes. Inner ring 50 is disposed generally radially inward of outer ring 48 and is connected thereto by struts 52. Outer ring 48, inner ring 50 and struts 52 form a portion of a load path through engine 10 (FIG. 1). Frame 42 is sometimes referred to as a "cold frame" because fairing 46 shields frame 42 from heat of combustion gases 34.

Fairing 46 is adapted to be disposed within frame 42 between outer ring 48 and inner ring 50. Specifically, struts 58 encase struts 52, while outer ring 54 and inner ring 56 line outer ring 48 and inner ring 50, respectively. In the described embodiment, outer ring 54 and inner ring 56 of fairing 46 have generally conical shapes, and are connected to each other by struts 58. In other embodiments, outer ring 54 and inner ring 56 may have other shapes. Outer ring 54, inner ring 56, and struts 58, define a portion of a gas flow path that passes through frame 42.

Load rings 44 and 45 comprise full-hoops that are used to strengthen and assemble the individual components of fairing 46. Fairing 46 is connected to load rings 44 and 45 when assembled, and load ring 44 can be used to facilitate assembly with frame 42. Load ring 44 is attached to an axial aft end of outer ring 54. Likewise, load ring 45 is attached to an axial aft end of inner ring 56. Load rings 44 and 45 are used to, among other things, hold individual pieces comprising fairing 46 together as a sub-assembly to facilitate assembly of fairing 46 onto frame 42. Fairing 46 additionally includes leading edge load rings, as shown in FIG. 2B.

Figure 2B:
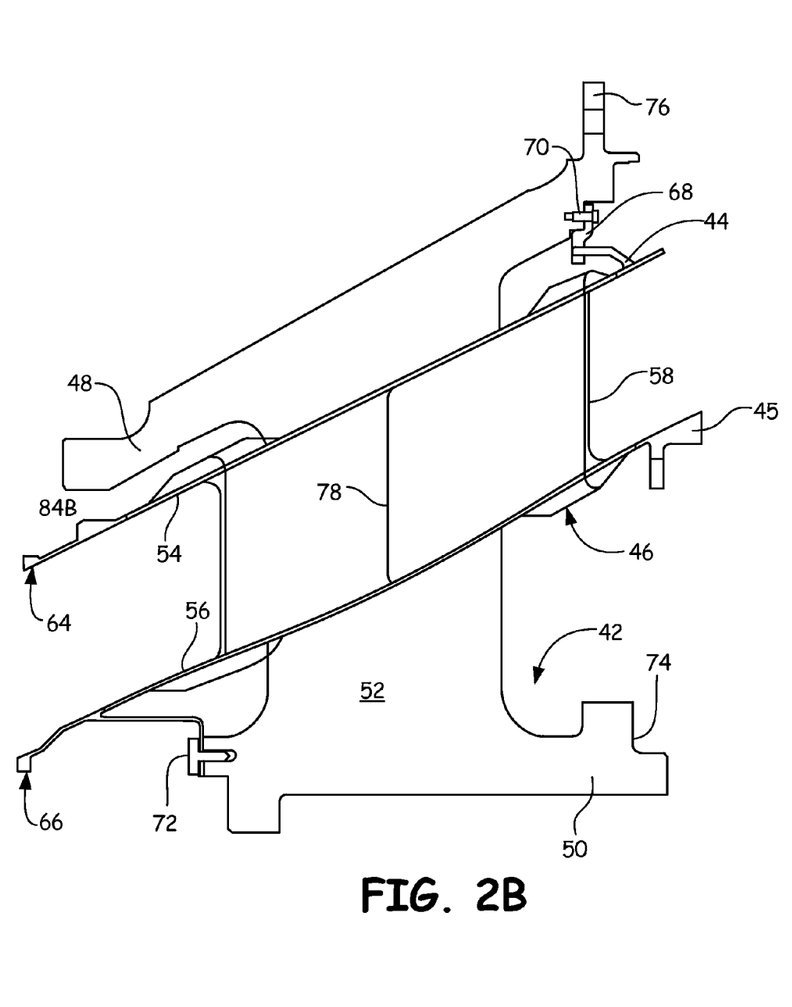
FIG. 2B is a cross-sectional view of the turbine exhaust case of FIG. 2A showing a strut of the frame extending through a strut of the fairing.

FIG. 2B shows a cross-section of LPTEC 40 having fairing 46 installed within frame 42. Frame 42 includes outer ring 48, inner ring 50 and strut 52. Fairing 46 includes outer ring 54, inner ring 56 and struts 58. In addition to aft outer load ring 44 and aft inner load ring 45, LPTEC 40 also includes forward outer and inner load rings 64 and 66, annular mount 68, fasteners 70 and fasteners 72.

Frame 42 comprises a single piece, ring-strut-ring body wherein strut 52 is integrally connected to outer ring 48 and inner ring 50. As mentioned, a flow path for gas exiting gas turbine engine 10 (FIG. 1) passes between outer ring 48 and inner ring 50 within fairing 46. Frame 42 also includes other features, such as flange 74, flange 76 and bolt holes (not shown), to permit frame 42 to be mounted to components of gas turbine engine 10 (FIG. 1), such as low pressure turbine section 24, power turbine section 26 or an exhaust nozzle.

Fairing 46 comprises a thin-walled structure that lines the flow path through frame 42. Specifically, outer ring 54 and inner ring 56 define the boundaries of an annular flow path.

Struts 58 intermittently interrupt the annular flow path to protect struts 52 of frame 42. Fairing 46 is comprised of a plurality of components that, in the view of FIG. 2B, are joined at split line 78 to form a ring-strut-ring body that fits within the ring-strut-ring body of frame 42.

Figure 3:
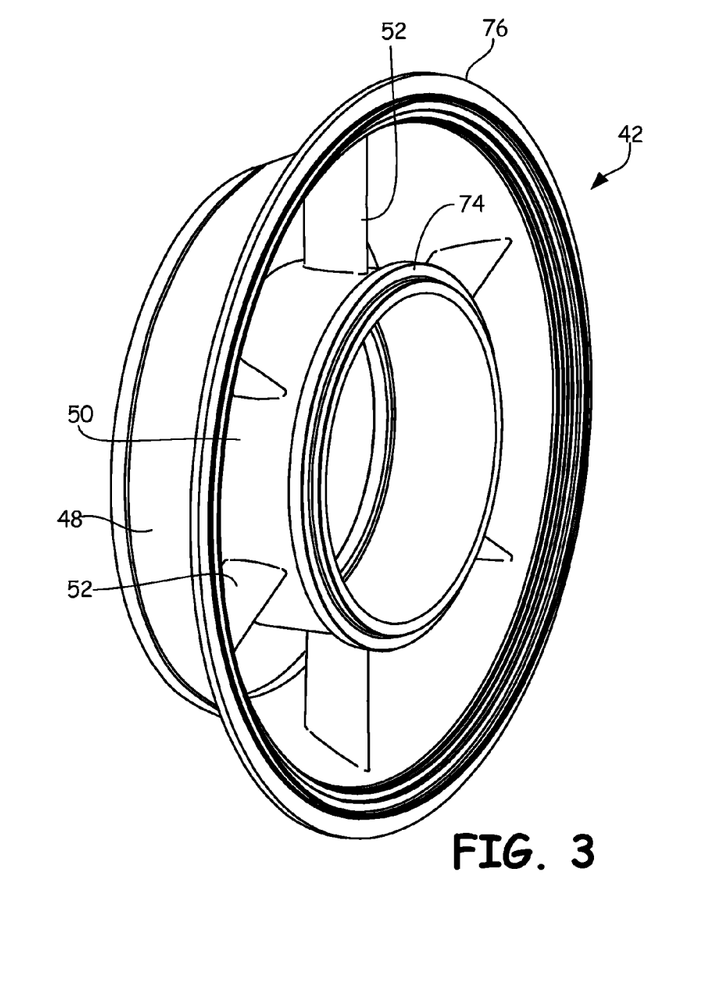
FIG. 3 is a perspective view of the ring-strut-ring frame of FIG. 2A showing the monolithic construction of the frame.

FIG. 3 is a perspective view of frame 42 of FIG. 2A. Frame 42 comprises a monolithic structure that joins outer ring 48, inner ring 50 and struts 52. In other words, frame 42 is of a single piece, unitary construction. In one embodiment, frame 42 is cast out of a high strength metal, such as nickel, titanium or steel. Frame 42 may, however, be machined from a unitary block. Struts 52 of frame 42 can be hollow and includes passages to permit components of gas turbine engine 10 to communicate with the interior of gas turbine engine 10 near shafts 36 and 38 (FIG. 1). For example, cooling air lines and lubricating oil lines can be passed through LPTEC 40 so as to cool bearings or other components of the engine. Outer ring 48 and inner ring 50 define annular load paths connected by struts 52. Fairing 46 is fitted into the flow path to protect frame 42 from the extreme temperatures of the hot gas flowing through LPTEC 40.

Figure 4:
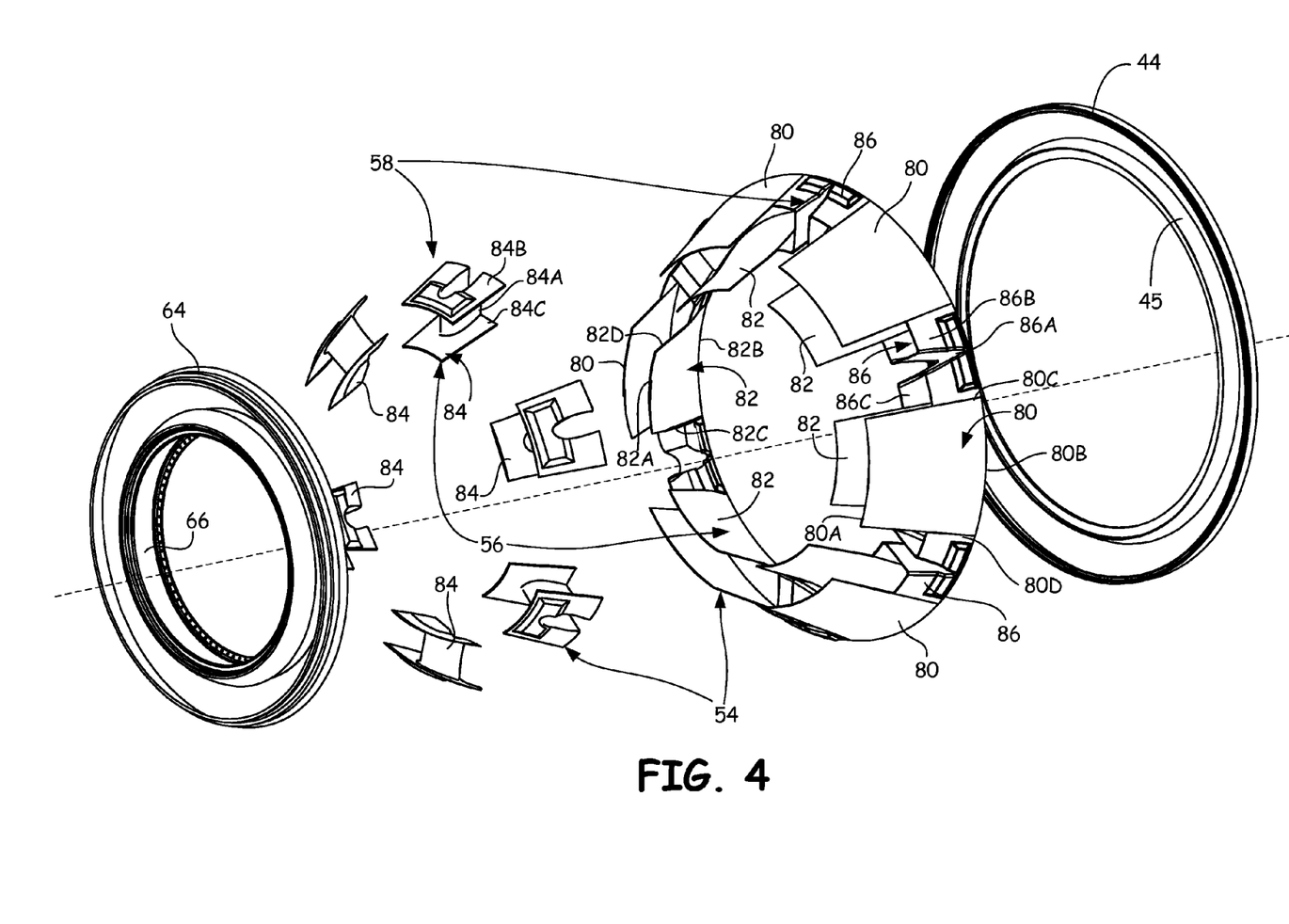
FIG. 4 is a partially exploded view of the ring-strut-ring fairing of FIG. 2A showing the multi-piece construction of the fairing.

FIG. 4 is a partially exploded view of fairing 46 of FIG. 2A. Fairing 46 includes outer ring 54, inner ring 56 and struts 58 when assembled. Fairing 46 is comprised of thin-walled segments that can be manufactured using a variety of processes. For example, the segments of fairing 46 can be cast in their final shape or can be made as flat pieces that are bent or wrought into their final shape. When unassembled, fairing 46 is formed of outer segments 80, inner segments 82, forward strut segments 84 and aft strut segments 86. Outer segments 80 and inner segments 82 comprise rectilinear segments that are arcuate in the circumferential direction with respect to axis 12 of gas turbine engine 10 (FIG. 1). Specifically, each outer segment 80 comprises leading edge 80A, trailing edge 80B, first side 80C and second side 80D. Each inner segment 82 comprises leading edge 82A, trailing edge 82B, first side 82C and second side 82D. Similarly, forward strut segments 84 and aft strut segments 86 comprise strut halves that join adjacent pairs of shroud halves. Specifically, forward strut segment 84 comprises strut shell 84A, outer shroud half 84B and inner shroud half 84C. Similarly, aft strut segment 86 comprises strut shell 86A, outer shroud half 86B and inner shroud half 86C.

As will be discussed in greater detail later, aft load rings 44 and 45 connect outer segments 80, inner segments 82 and aft strut segments 86 to facilitate assembly of and to strengthen fairing 46 when fully assembled Likewise, forward load rings 64 and 66 connect outer segments 80, inner segments 82 and forward strut segments 84 to facilitate assembly of and to strengthen fairing 46 when fully assembled. Assembly of fairing 46 is described with reference to FIGS. 5A-8.

Figure 5A:
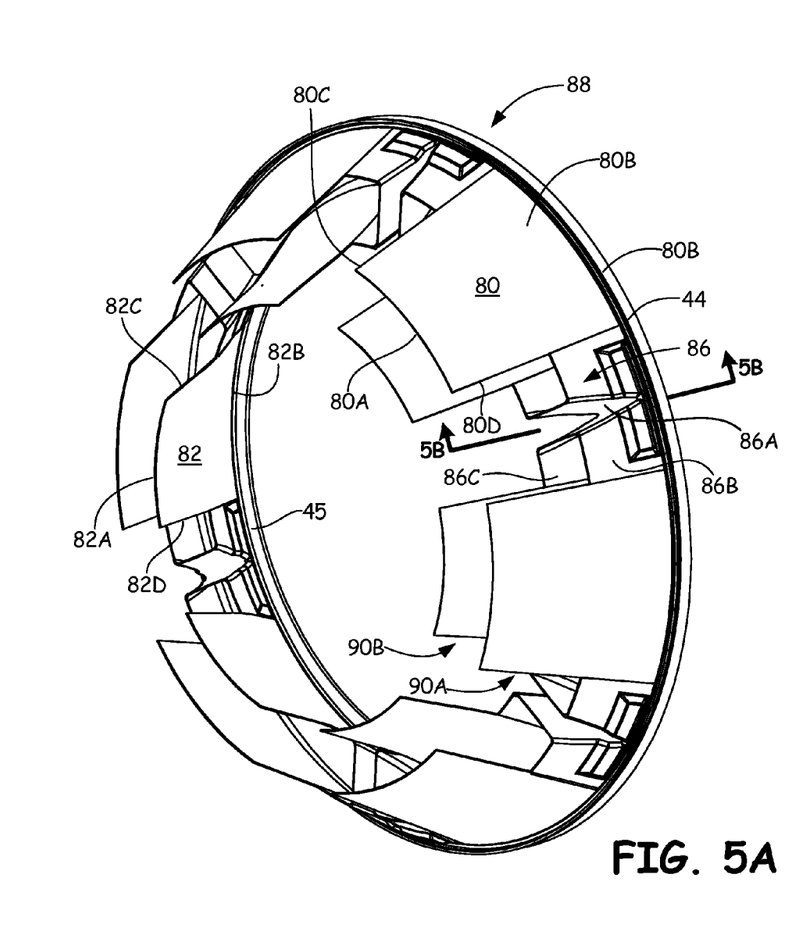
FIG. 5A is a perspective view of a fairing sub-assembly that can be inserted into the frame.
Figure 5B:
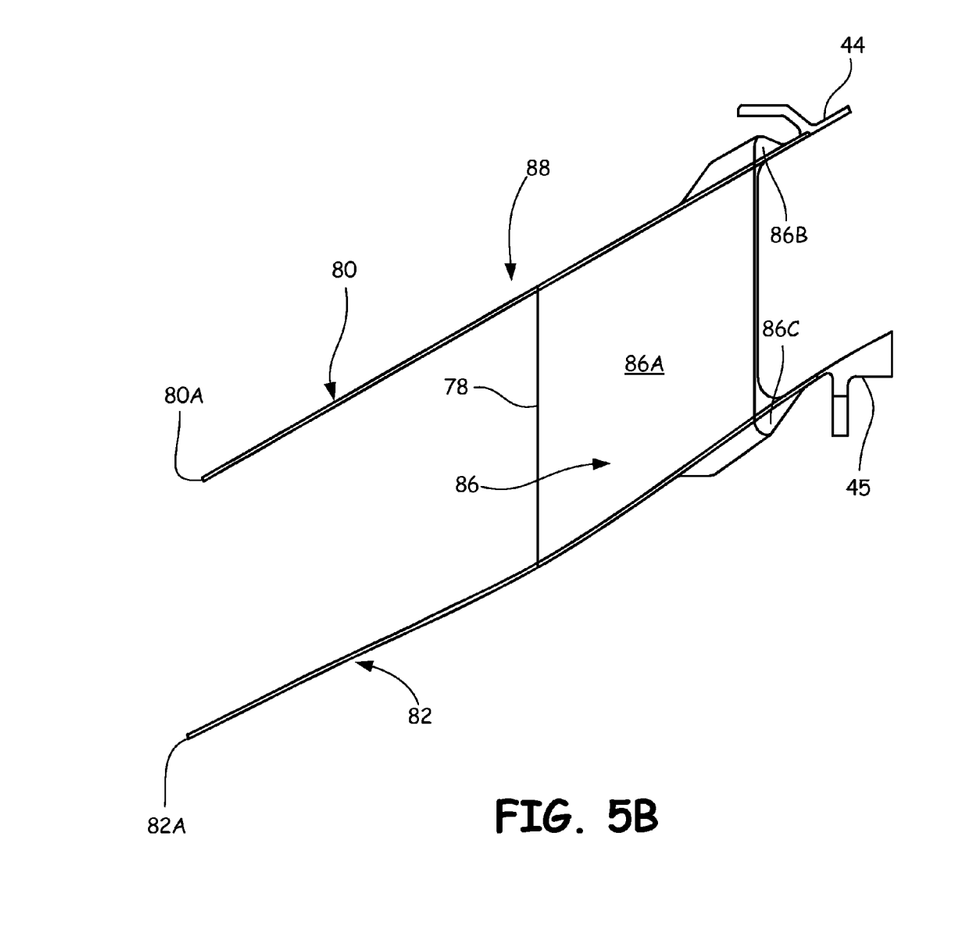
FIG. 5B is a cross-sectional view of the fairing sub-assembly of FIG. 5A.

FIG. 5A is a perspective view of fairing 46 partially assembled into sub-assembly 88. FIG. 5B, which is discussed concurrently with FIG. 5A, is a cross-sectional view of sub-assembly 88 of FIG. 5A. To assemble fairing 46, trailing edges 80B of outer segments 80 are joined to load ring 44 such that outer segments 80 are evenly spaced around the circumference of load ring 44. The space between neighboring outer segments 80 is approximately equal to the arc length of outer shroud half 86B of aft strut segments 86. Similarly, trailing edges 82B of inner segments 82 are joined to load ring 45. The space between neighboring inner segments 82 is approximately equal to the arc length of inner shroud half 86C. Aft strut segments 86 are positioned between neighboring outer segments 80 so that outer shroud half 86B can be joined to load ring 44. Likewise, aft strut segments 86 are positioned between neighboring inner segments 82 so that inner shroud half 86C can be joined to load ring 45. As will be discussed later, load rings 44 and 45 provide stiffening to fairing 46 when fully assembled, in addition to facilitating assembly as described here.

Load rings 44 and 45, outer segments 80, inner segments 82 and aft strut segments 86 can be assembled in any order. In one embodiment, outer segments 80 and outer shroud halves 86B are first joined to load ring 44. Outer shroud halves 86B and outer segments 80 are also joined to each other. Next, load ring 45 is joined to inner shroud halves 86C. Finally, inner segments 82 are joined to load ring 45 and inner shroud halves 86C. To provide the strongest structure, all mating faces are joined together using any suitable method. In one embodiment, the segments are welded together along the entire length of each mating face. In other embodiments, intermittent spot welds can be used. Assembled as such, outer segments 80, and aft strut segments 86 form slots 90A, and inner segments 82 and aft strut segments 86 form slots 90B. Slots 90A and 90B are configured to receive forward strut segments 84 (FIG. 4) after sub-assembly 88 is positioned within frame 42. The forward edges of aft strut segments 86 define split line 78, which mates with aft edges of forward strut segments 84.

Figure 6:
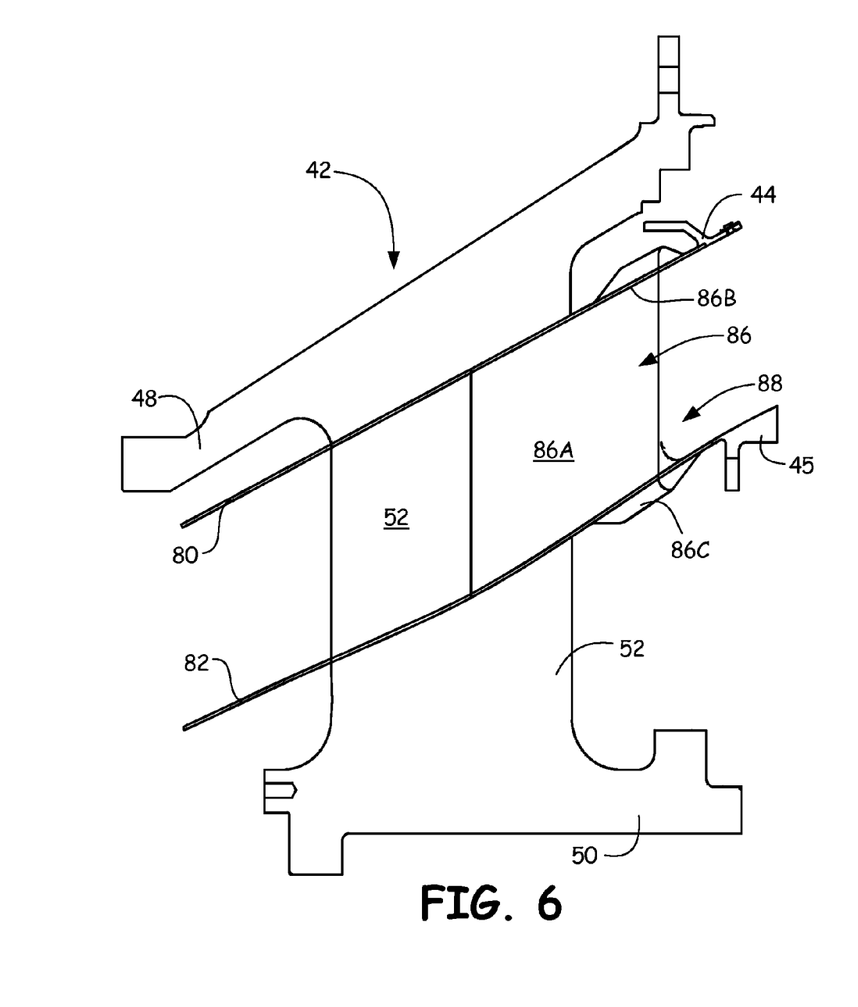
FIG. 6 is a cross-sectional view of the fairing sub-assembly of FIG. 5B inserted into the frame.

FIG. 6 is a cross-sectional view of sub-assembly 88 of FIG. 5B inserted into frame 42. Sub-assembly 88 is inserted into frame 42 from the trailing edge, or aft, end so that outer segment 80 is radially inward of outer ring 48 and inner segment 82 is radially outward of inner ring 50. Aft strut segment 86 partially surrounds strut 52. Specifically, aft strut shell 86A covers approximately the aft half of strut 52 in the embodiment disclosed. Sub-assembly 88 can be supported within frame 42 by any suitable means. In one embodiment, load ring 44 can be supported within outer ring 48 using annular mount 68 (FIG. 2B). However, it is desirable to not have sub-assembly 88 restricted to permit the segments of fairing 46 to be assembled without inducing any residual strain, such as strain that might arise during a welding process. With sub-assembly 88 inserted into frame 42, forward strut segments 84 (FIG. 4) can be brought into engagement with aft strut segments 86 to encapsulate portions of the lengths of struts 52.

Figure 7:
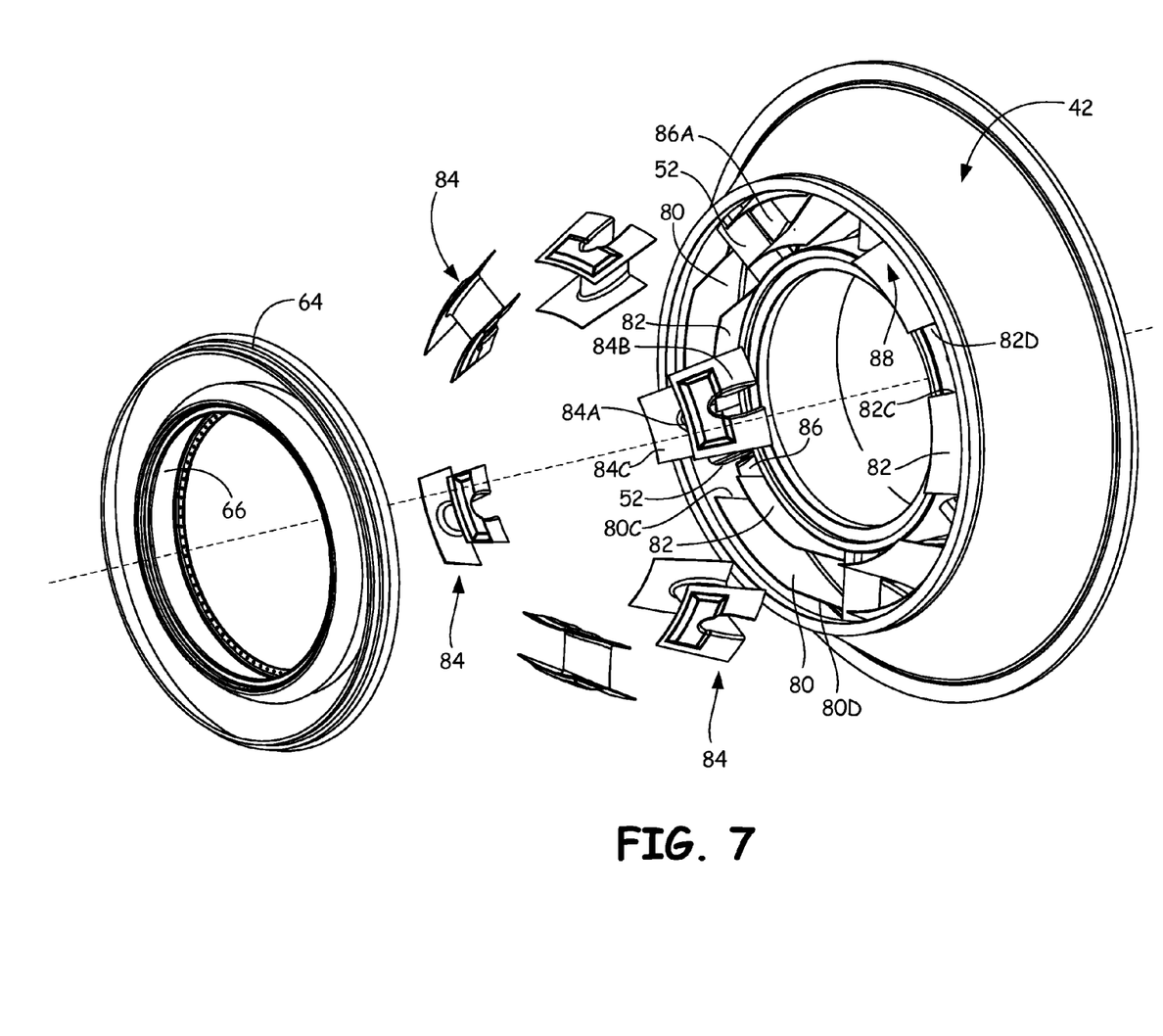
FIG. 7 is a front perspective view of the fairing sub-assembly inserted into the frame with unassembled fairing components exploded from the sub-assembly.

FIG. 7 is a front perspective view of sub-assembly 88 of fairing 46 inserted into frame 42 with forward strut segments 84 exploded from sub-assembly 88. Outer segments 80 and aft strut segments 86 form three-sided slots 90A (FIG. 5A) between edges 80C and 80D into which shroud half 84B of forward strut segments 84 can be inserted. Likewise, inner segments 82 and aft strut segments 86 form three-sided slots 90B (FIG. 5A) between edges 82C and 82D into which shroud half 84C of forward strut segments 84 can be inserted. Outer shroud halves 84B of forward strut segment 84 are inserted into slots 90A, and inner shroud halves 84C are inserted into slot 90B. Forward strut shell 84A is brought into engagement with aft strut shell 86A so that a shroud is formed around struts 52. Strut segments 84 are thereafter joined to sub-assembly 88. As discussed above, strut segments 84 can be welded into place such that the all mating faces are joined along their entire lengths.

Load rings 64 and 66 are subsequently joined to sub-assembly 88 and forward strut segments 84. Specifically, outer load ring 64 is joined to outer segments 80 and outer shroud halves 84B of forward strut segments 84. Inner load ring 66 is joined to inner segments 82 and inner shroud halves 84C. Load rings 64 and 66 complete the assembly of fairing 46. Load rings 64 and 66 provide stiffening to fairing 46 similarly to that of load rings 44 and 45. Load rings 44, 45, 64 and 66 also provide structural points at which fairing 46 can be joined to frame 42.

Figure 8:
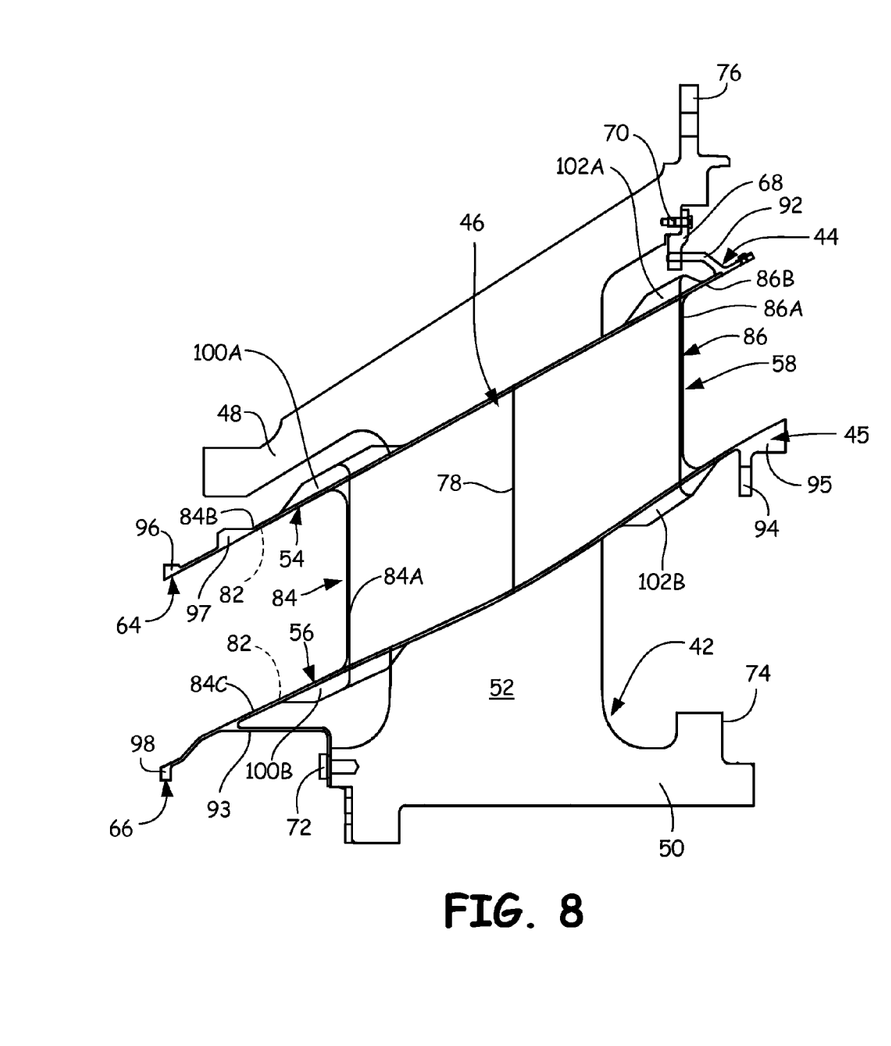
FIG. 8 is a cross-sectional view of the complete fairing assembled onto the frame showing the location of stiffening rings and pads on the fairing.

FIG. 8 is a cross-sectional view of completely assembled fairing 46 fitted into frame 42. FIG. 8 is the same view as FIG. 2A, with additional elements numbered. Fairing 46 includes load rings 44, 45, 64 and 66. Load ring 44 includes flange 92. Load ring 45 includes flange 94 and rim 95. Load ring 64 includes rim 96 and land 97. Load ring 65 includes rim 98. Forward strut segment 84 includes pads 100A and 100B. Aft strut segment 86 includes pads 102A and 102B.

Fairing 46 is joined to frame 42 at the interface of annular mount 68 and flange 92. For example, annular mount 68 can be bolted to outer ring 48, and flange 92 can be inserted into an opening in annular mount 68, thereby providing a free-floating connection or radial spline. Additionally, fairing 46 can be rigidly attached to frame 42 by fastening flange 93 of load ring 66 to inner ring 50 of frame 42 with fastener 72.

When completely assembled onto frame 42, fairing 46 is trapped in position such that fairing 46 cannot be non-destructively removed. That is, fairing 46 must be cut-away from frame 42 in order to separate the two components. Alternatively, frame 42 can be cut apart from fairing 46. Fairing 46 is thin-walled and can therefore be easily repaired by selectively removing portions of fairing 46 and replacing the portions with new material that can be joined to the existing structure. Fairing 46 is not subject to excessive loads within gas turbine engine 10 (FIG. 1) and can therefore withstand structural interruptions formed by assembly of the segments (80, 82, 84, 86) and subsequent repair procedures. Frame 42, however, remains as a single-piece or monolithic structure without inherent structural interruptions (e.g. joints or welds) in order to provide strength and stability to gas turbine engine 10 (FIG. 1).

Load rings 44, 45, 64 and 66 provide stiffening to the annuluses formed by the connection of sub-assembly 88 with forward strut segments 84. Outer segments 80, inner segments 82, outer shroud halves 86B, outer shroud halves 84B, inner shroud halves 86C and inner shroud halves 84C are generally formed of thin metal materials and, as such, have a tendency to deform when subjected to loading within gas turbine engine 10 (FIG. 1). Load rings 44, 45, 64 and 66 are joined to fairing 46 to strengthen outer ring 54 and inner ring 56 when fully assembled. Load rings 44, 45, 64 and 66 can be of any suitable cross-section, but are generally thicker than outer segments 80 and inner segments 82. More particularly, load rings 44, 45, 64 and 66 include features that are radially taller than outer segments 80 and inner segments 82 such that they provide more resistance to bending or loading in the circumferential and axial directions. Furthermore, load rings 44, 45, 64 and 66 comprise full-hoop bodies so that they do not include any structural interruptions, thereby providing stiffening to the annular shape formed by outer segments 80, inner segments 82, forward strut segments 84 and aft strut segments 86.

Load rings 44, 45, 64 and 66 include circumferential features for strengthening and stiffening the entirety of fairing 46. In particular, load ring 44 includes flange 92 which is thicker than outer shroud half 86B. Flange 92 may also be fashioned for assembling fairing 46 to frame 42 using annular mount 68. Load ring 45 includes flange 94, which increases the height of load ring 45 to provide additional resistance to deformation. Similarly, rim 95 comprises a thickening of load ring 45 that provides strength. Load ring 64 includes rim 96 and land 97, which both strengthen and stiffen load ring 64. Land 97 may also be used as a mating surface for seals used to seal between fairing 46 and frame 42. For example, land 97 may provide a flat planar, or cylindrical surface having an orientation that permits flush engagement with a seal. Load ring 64 includes rim 98, which strengthens and stiffens load ring 66. Flange 92, flange 94, rim 95, rim 96, land 97 and rim 98 comprise only a narrow portion of the axial length of their respective load ring. In other words, the entire axial length of rings 44, 45, 64 and 66 need not be radially thickened to provide stiffening. Flange 92, flange 94, rim 95, rim 96, land 97 and rim 98 comprise full three-hundred-sixty-degree features in the disclosed embodiment. However, in other embodiments, these stiffening features can be intermittent or interrupted around the circumferences of load rings 44, 45, 64 and 66.

Fairing 46 also includes pads 100A, 100B, 102A and 102B, which provide localized stiffening to fairing 46 in between load rings 44, 45, 64 and 66. Specifically, pads 100A-102B provide stiffening of forward and aft strut segments 84 and 86 near strut shells 84A and 86A. The intersection of strut shells 84A and 86A with inner and outer shroud halves 84B, 84C, 86B and 86C generate localized stress concentrations. Pads 100A-102B provide strengthening to shroud halves 84B, 84C, 86B and 86C to guard against creep, fatigue, and potential failure from the stress concentrations.

Figure 9A:
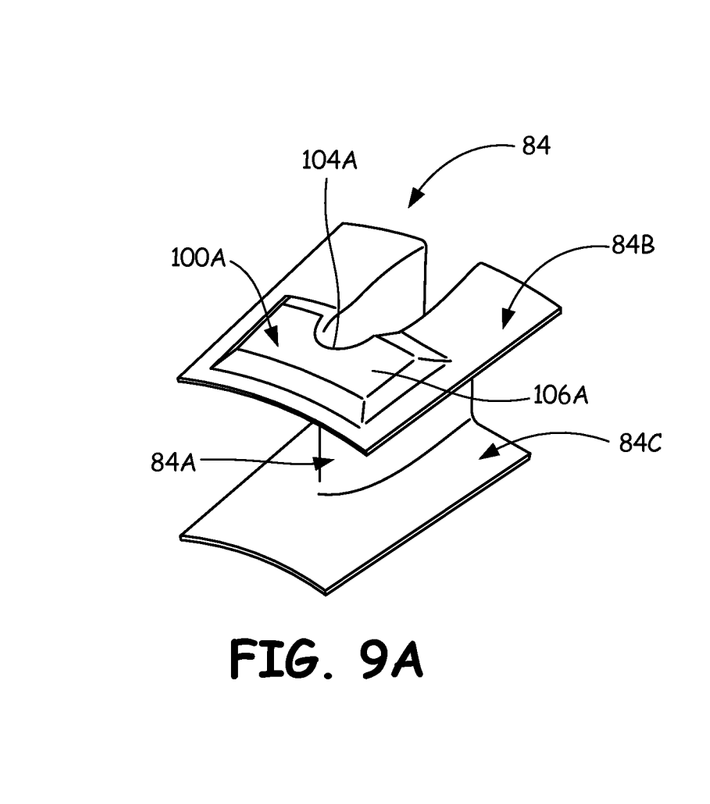
FIG. 9A is a perspective view of an outer end of a leading edge fairing strut shell showing a stiffening pad on a forward shroud half.
Figure 9B:
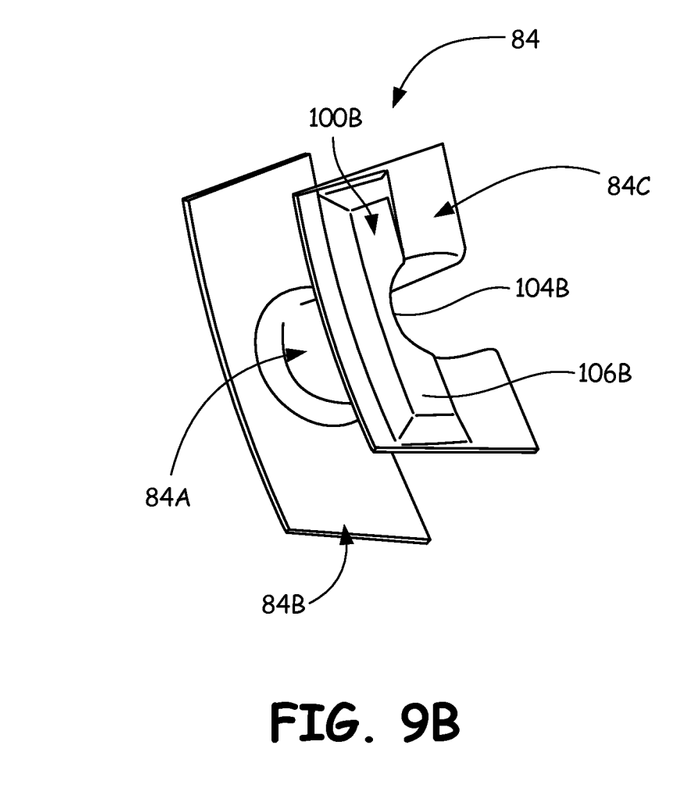
FIG. 9B is a perspective view of an inner end of a leading edge fairing strut shell showing a stiffening pad on a forward shroud half.

FIG. 9A is a perspective view of forward strut segment 84 showing outer shroud half 84A and pad 100A. FIG. 9B is a perspective view of forward strut segment 84 showing inner shroud half 84B and pad 100B. Pad 100A comprises a rectilinear outline having U-shaped cut-out 104A to accommodate strut shell 84A. Likewise, pad 100B comprises a rectilinear outline having U-shaped cut-out 104B to accommodate strut shell 84A. U-shaped cut-outs 104A and 104B trace a portion of the outline of strut shell 84A to provide reinforcement along areas where stress concentrations occur. Although pads 100A and 100B are shown having a particular rectilinear configuration, pads 100A and 100B may have other geometries and shapes. For example, pads 100A and 100B may be circular or oval, may have rounded edges or may have curved surfaces.

Top surfaces 106A and 106B are generally concentric with outer shroud half 84B and inner shroud half 84C, respectively, so as to avoid producing stress concentrations. Specifically, top surfaces 106A and 106B are uniformly spaced from shroud halves 84A and 84B to provide hoop segments that strengthen strut segments 84 in the circumferential direction. Side surfaces of pads 100A and 100B, such as surfaces 108A and 108B, are obliquely angled with respect to surfaces 106A and 106B, and shroud halves 84B and 84C to avoid sharp angles that may produce stress concentrations.

In the embodiment shown, pads 100A and 100B do not encompass the entirety of shroud halves 84B and 84C so as to not add unnecessary weight to fairing 46. Pads 100A and 100B can, however, be extended to the edges of shroud halves 84A and 84B in other embodiments to provide additional stiffening and strengthening. Likewise, pads 100A and 100B may extend further around the outline of strut shell 84A to further strengthen the joint between strut shell 84A and shroud halves 84B and 84C in other embodiments. Pads 102A and 102B of aft strut segment 86 (FIG. 8) are constructed similarly to pads 100A and 100B.

Discussion of Possible Embodiments

The following are non-exclusive descriptions of possible embodiments of the present invention:

A turbine exhaust case comprising a monolithic ring-strut-ring frame; and a multi-segment ring-strut-ring fairing assembled around the frame.

The turbine exhaust case of the preceding paragraph can optionally include, additionally and/or alternatively, any one or more of the following features, configurations and/or additional components:

A monolithic ring-strut-ring frame comprising an inner ring, an outer ring, and a plurality of struts connecting the inner ring and the outer ring.

A multi-segment ring-strut-ring fairing comprising a plurality of outer diameter shroud segments, a plurality of inner diameter shroud segments, and a plurality of strut segments joined between the outer diameter shroud segments and the inner diameter shroud segments.

Segments of the multi-segment fairing that are joined in-place around the monolithic frame.

A turbine exhaust case wherein: the plurality of outer diameter shroud segments are positioned radially inward of the outer ring; and the plurality of inner diameter shroud segments are positioned radially outward of the inner ring.

A plurality of strut segments comprising an outer fairing portion, an inner fairing portion, and a strut shell connecting the inner and outer fairing portions.

A turbine exhaust case further comprising pads located on the inner and outer fairing portions.

A turbine exhaust case further comprising an outer stiffening ring connecting the plurality of outer diameter shroud segments and the plurality of strut segments, and an inner stiffening ring connecting the plurality of inner diameter shroud segments and the plurality of strut segments.

A turbine exhaust case wherein the monolithic frame is cast as a single piece of metal.

A turbine exhaust case wherein each of the segments of the multi-segment fairing comprises a wrought piece of metal.

A method for assembling a gas turbine engine structural component comprises fabricating a monolithic frame through which a flow path extends, fabricating a plurality of shroud segments that are shaped to mate with the frame, positioning the plurality of shroud segments within the frame so as to form a fairing that lines the flow path, and joining the plurality of segments to each other so that the fairing is trapped onto the frame.

The method of the preceding paragraph can optionally include, additionally and/or alternatively, any one or more of the following features, steps, configurations and/or additional components:

A method wherein the monolithic frame is cast, and the plurality of shroud segments are wrought.

A method wherein joining the plurality of segments comprises welding or brazing the plurality of segments.

A method wherein the monolithic frame comprises a ring-strut-ring structure such that the flow path is defined between rings, the monolithic frame comprising an inner ring, an outer ring, and a plurality of struts connecting the inner ring and the outer ring.

A method wherein the plurality of shroud segments comprises a plurality of outer diameter shroud segments positioned radially inward of the outer ring; a plurality of inner diameter shroud segments positioned radially outward of the inner ring, and a plurality of strut segments connecting outer diameter shroud segments to inner diameter shroud segments, the plurality of strut segments divided into mating forward and aft strut shells that encapsulate struts of the monolithic frame.

A method comprising forming a sub-assembly by joining the plurality of outer diameter shroud segments and the aft strut shells to an outer ring, and joining the plurality of inner diameter shroud segments and the aft strut shells to an inner ring.

A method comprising inserting the sub-assembly into the monolithic frame, and joining the forward strut shells to the outer and inner rings such that each of the plurality of struts is positioned between an aft strut shell and a forward strut shell.

A method comprising joining a forward outer ring to the plurality of shroud segments, and joining a forward inner ring to the plurality of shroud segments.

A method comprising fastening the fairing to the monolithic frame.

A fairing for a ring-strut-ring frame that defines a flow path comprises a plurality of outer diameter shroud segments, a plurality of inner diameter shroud segments, a plurality of strut segments connecting the outer diameter shroud segments and the inner diameter shroud segments, and stiffening features connected to the plurality of strut segments to strengthen the fairing.

The turbine exhaust case of the preceding paragraph can optionally include, additionally and/or alternatively, any one or more of the following features, configurations and/or additional components:

Stiffening features comprising a plurality of pads disposed at radial outer and radial inner surfaces of the plurality of strut segments.

Stiffening features comprising an outer ring connecting axial surfaces of the plurality of outer shroud segments and the plurality of strut segments, and an inner ring connecting axial surfaces of the plurality of inner shroud segments and the plurality of strut segments.

Strut shells comprising an outer shroud portion, an inner shroud portion, and a strut shell connecting the outer shroud portion and the inner shroud portion.

A fairing wherein the outer shroud portion and the inner shroud portion comprise rectilinear shapes with recesses in one side, and the strut shell comprises an elongated member having a shape of the recesses, the strut shell connecting the recesses of the outer shroud portion and the recesses of the inner shroud portion.

Stiffening features comprising thickened regions of the outer shroud portions and the inner shroud portions along the strut shell.

Stiffening features comprising an outer ring connecting the plurality of outer shroud segments and the outer shroud portions, and an inner ring connecting the plurality of inner shroud segments and the inner shroud portions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine exhaust case comprising:
   a monolithic ring-strut-ring frame comprising:
      an inner ring;
      an outer ring; and
      a plurality of struts connecting the inner ring and the outer ring; and
   a multi-segment ring-strut-ring fairing assembled around the frame, the multi-segment ring-strut-ring fairing comprising:
      a plurality of outer diameter shroud segments;
      a plurality of inner diameter shroud segments; and
      a plurality of strut segments joined between the outer diameter shroud segments and the inner diameter shroud segments, wherein each of the plurality of strut segments comprises:
         an outer fairing portion;
         an inner fairing portion;
         a strut shell connecting the inner and outer fairing portions; and
         pads located on the inner and outer fairing portions, wherein the pads extend a partial distance along inner and outer fairing portions to provide local stiffening at leading edge and trailing edge intersections of the strut shell with the inner and outer fairing portions.

2. The turbine exhaust case of claim 1 wherein the segments of the multi-segment fairing are joined in-place around the monolithic frame.

3. The turbine exhaust case of claim 1 wherein:
   the plurality of outer diameter shroud segments are positioned radially inward of the outer ring; and
   the plurality of inner diameter shroud segments are positioned radially outward of the inner ring.

4. The turbine exhaust case of claim 1 and further comprising:
   an outer stiffening ring connecting the plurality of outer diameter shroud segments and the plurality of strut segments; and
   an inner stiffening ring connecting the plurality of inner diameter shroud segments and the plurality of strut segments.

5. The turbine exhaust case of claim 1 wherein the monolithic frame is cast as a single piece of metal.

6. The turbine exhaust case of claim 1 wherein each of the segments of the multi-segment fairing comprises a wrought piece of metal.

7. The turbine exhaust case of claim 1, wherein side edges of each pad are obliquely angled such that a pad thickness diminishes near the side edges of each pad.

8. A fairing for a ring-strut-ring frame that defines a flow path, the fairing comprising:
   a plurality of outer diameter shroud segments;
   a plurality of inner diameter shroud segments;
   a plurality of strut segments connecting the outer diameter shroud segments and the inner diameter shroud segments, wherein each of the strut segments comprises:
      an outer shroud portion;
      an inner shroud portion; and
      a strut shell connecting the outer shroud portion and the inner shroud portion; and
   stiffening features connected to the plurality of strut segments to strengthen the fairing, wherein the stiffening features comprise:
      an outer ring independent of the ring-strut-ring frame connecting axial surfaces of each of the plurality of outer shroud segments and each of the plurality of strut segments; and an inner ring independent of the ring-strut-ring frame connecting axial surfaces of each of the plurality of inner shroud segments and each of the plurality of strut segments.

9. The fairing of claim 8 wherein:

the outer shroud portion and the inner shroud portion comprise rectilinear shapes with recesses in one side; and the strut shell comprises an elongated member having a shape of the recesses, the strut shell connecting the recesses of the outer shroud portion and the recesses of the inner shroud portion.

10. The fairing of claim 8 wherein the stiffening features further comprise:

thickened regions of the outer shroud portions and the inner shroud portions along the strut shell.

11. The fairing of claim 10, wherein the thickened regions extend a partial distance along the inner and outer shroud portions to provide local stiffening at leading edge and trailing edge intersections of the strut shell with the inner and outer shroud portions.

12. The turbine exhaust case of claim 11, wherein side edges of each thickened region are obliquely angled such that a thickness of each thickened region diminishes near the side edges of each thickened region.

13. The fairing of claim 8 wherein the outer ring connects the plurality of outer shroud segments and the outer shroud portions; and wherein the inner ring connects the plurality of inner shroud segments and the inner shroud portions.

\* \* \* \* \*